Feb. 10, 1970     G. A. BAUD     3,494,462
SLUDGE SETTLING APPARATUS
Filed July 22, 1968     3 Sheets-Sheet 3
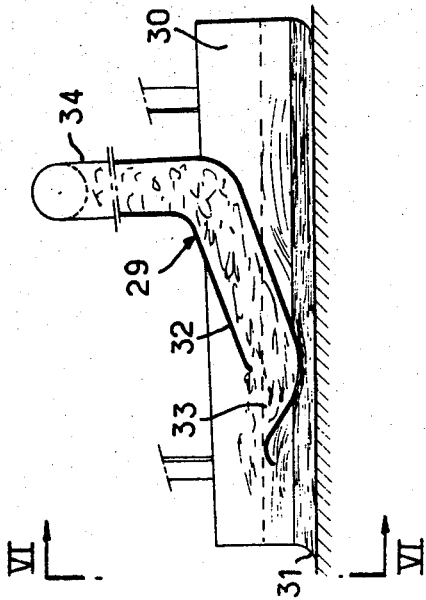
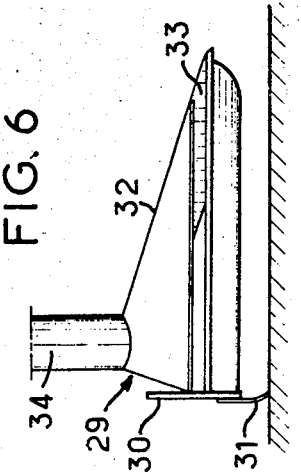
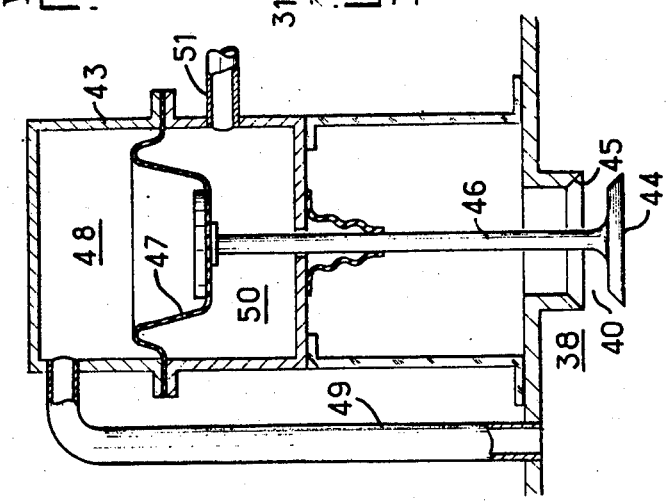
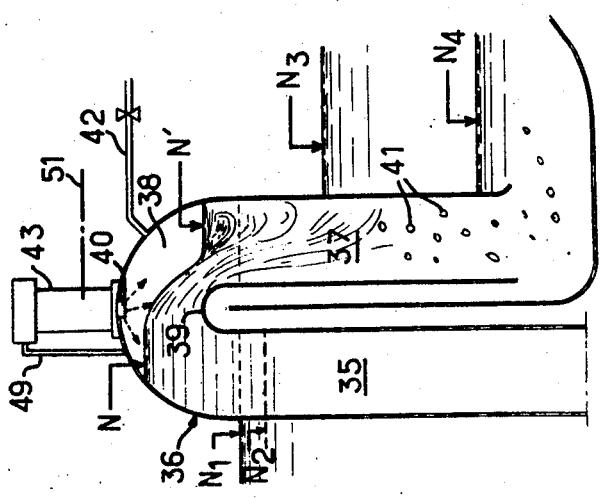
INVENTOR
GEORGES ANDRÉ BAUD
BY Young + Thompson
ATTYS.

United States Patent Office 3,494,462
Patented Feb. 10, 1970

3,494,462
SLUDGE SETTLING APPARATUS
Georges André Baud, Le Raincy, France, assignor to Societe Generale d'Epuration et d'Assainissement, Paris, France
Filed July 22, 1968, Ser. No. 746,681
Claims priority, application France, July 28, 1967, 116,084
Int. Cl. B01d 21/24
U.S. Cl. 210—112      4 Claims

ABSTRACT OF THE DISCLOSURE

Sludge-settling apparatus comprising a tank having an intake for sludge water, an overflow for clear water and at least one sludge-evacuation system, in which at least one partial syphon having an air space maintained above the liquid fed into the syphon from its rising pipe to its down-pipe has its inlet adapted to move in the vicinity of the bottom of the tank so as to evacuate the sludge through the intermediary of the partial syphon, the partial syphon being characterized by means to maintain a body of air at a regulable pressure above the liquid in the syphon.

---

The present invention relates to a sludge-settling apparatus comprising a tank having an inlet for impure water or liquid, an overflow for clear water and at least one sludge-evacuation system, and is more particularly although not exclusively concerned with a settling apparatus in which the tank is circular and operates, at least in part, by scraping the sludge.

In purification installations for waste water, operating by the technique of activated sludges, settling tanks are generally employed to separate the effluent from these sludges in the final clarification stage of the water. The separated sludges are then sent to aeration tanks, while the clarified water is evacuated to the outlet of the installation.

An octivated sludge is a complex medium, formed essentially by four constituents:

Water, in a very high proportion (99.5 to 99.9%);
Bacteria and aerobic micro-organisms;
Organic materials in suspension and in solution;
Mineral materials in suspension and solution.

The activity of this sludge is essentially dependent on its condition of freshness, that is to say on the maintenance of the micro-organisms in contact with the oxygen of the air. From this point of view, it is desirable to draw-off the sludges deposited in the settling tanks as rapidly as possible so as to transfer them without delay to the aeration tanks. This is the purpose of the re-circulation circuit known as "return sludges."

During the course of the purification process however, the mass of sludge tends constantly to increase due to metabolisation by the active organisms of the new matter brought in by the water to be purified, and it is necessary to eliminate a part of this sludge in order to keep it in its state of biochemical equilibrium.

This is the purpose of the so-called "excess sludges" circuit. It would be an advantage only to evacuate "in excess" the less-active fractions of the sludge deposited in the settling tanks, if such a discrimination could be carried out systematically. However, the only criterion which can be applied to divide the sludge is its behaviour upon settlement or decantation. In general, the most dense fractions of the sludge are the most mineralized, and therefore the least interesting from the point of view of their activity. However, these dense fractions may be retained with advantage, because they permit a better overall decantation and therefore a better purification.

Conversely, the light sludges which may be very active but which decant badly must be eliminated if it is desired to prevent them from escaping with the effluent from the settling tanks.

Finally, it is necessary to be able to regulate simultaneously the content of material in suspension of the sludges in aeration, and the volume occupied by this sludge for a given mass of materials in suspension (Mohlmann index).

This regulation is generally carried out by separating the dense sludges from the light sludges at the outlet of the settling tanks, and by controlling the proportion of these two fractions which it is desired to retain.

The rates of re-circulation of the "return sludges" necessary to prevent too long stagnation of the sludges outside the aeration zone, depend essentially on the volume occupied by these sludges and therefore on their Mohlmann index. Under the usual conditions of utilization of the installations, calculation shows that rates higher than 200 or 300% would often be desirable. The technology of the installations does not in practice permit the economic achievement of such rates, except for special plants in which the aeration and settling tanks are mounted together in pairs so as to reduce to a minimum the travel of the return sludges. In this type of plant, the rate of re-circulation is only limited by the correct performance of the settling apparatus.

The settling tanks, especially circular, to which the invention relates, are separate from the aeration tanks, and the rate of re-circulation is limited by the consideration of the power to be employed for pumping from one plant to the other, and also by the large dimensions which the conduits may attain. It does not usually exceed 100% of the average through flow of the settling tank. Even under these conditions, the regular and controlled drawing-off of the sludges presents technical problems which have not found any satisfactory solution up to the present time.

Following the indications given above, this drawing-off must in fact be effected under the following conditions:

(1) The sludges of greatest density must be drawn-off separately, but at a small flow-rate (from 1 to 3% of the mean through flow, to give a general idea);

(2) The light sludges must be drawn-off at a high flowrate (from 25 to 100% of the average through-flow, for example);

(3) It must be possible to regulate the total flow of the light sludges at any moment, without stopping the settling tank;

(4) The flow-rate of light sludges extracted from each of the concentric sections constituting the bottom of the settling tank must also be capable of regulation so as to obtain either a uniform volume of sludge drawn-off per unit of surface of the bottom, or a uniform weight of materials in suspension per unit of this same surface (the flow-rates by volume being unequal in this case);

(5) The hydraulic pressure employed to ensure the discharge of the sludges must remain small in normal operation, so as to avoid excessive cost of subsequent raising, when it is necessary to send back the return sludges to the areation tanks.

Finally, in order to obviate the usual difficulties of utilization of this type of installation, it is desirable:

(a) to eliminate systematically all rotary joints between a scraper bridge and a device for collecting the light sludges;

(b) to have available an effective means for preventing choking of the sludge-transfer conduits, while permitting rapid clearing of stoppages at the cost of a minimum of manual operations and without stopping the settling tank.

The present invention has for its object a sludge settling tank which wholly or partly satisfies these conditions, and is of simple construction with effective operation, and which furthermore permits the conduits to be very easily freed if they become blocked.

The object of the invention is especially characterized in that at least one partial syphon is fed by a conduit, the inlet of which is permitted to move in the vicinity of the bottom of the tank so as to evacute the sludge through the intermediary of the said partial syphon.

By "partial syphon" in the present specification, there is meant a syphon in which an air space is maintained above the liquid which is fed into the syphon from the rising pipe to the down pipe.

The arrangement according to the invention permits of perfect evacuation of the sludges by means of the partial syphon, especially when the latter plays the part of a flow regulator.

In one non-limitative example of embodiment of the invention, the liquid flow from the partial syphon is controlled by a pilot gas-pressure.

According to another characteristic feature, at least two partial syphons are provided, and each of these receives a pre-determined pilot pressure, so that the various syphons work at controlled flow-rates, tending to prevent them from becoming blocked. In this way, all risk of defective operation is avoided.

In one form of construction, it is the same pilot pressure which is applied to all the various syphons, so that these latter work at the same flow-rate, while in an alternative form, different pilot pressures are applied to the various syphons so that the latter have different flow-rates adapted to a drawing-off programme which favours the conditions of utilization.

In addition, according to the invention, each syphon is adapted, in the event of its becoming blocked, to operate under an increased pressure to ensure its clearance, this increased pressure being obtained by a reduction of the downstream level which is produced for example by temporarily unpriming the other syphons.

According to another characteristic feature of the invention, one or more extraction devices are adapted to be disposed in the vicinity of the bottom of the tank and are arranged in such manner as to make a selection between the light sludges and the dense sludges for the purpose of separate evacuation of these two kinds of sludge. More particularly, each extraction device comprises on the one hand an inlet for light sludges slightly spaced above the bottom of the tank and coupled to a partial syphon for the evacuation of light sludges, and on the other hand, a scraper means cooperating with the bottom of the tank and adapted to direct the dense sludges towards their appropriate evacuation. These scraper means preferably comprise a blade provided with a flexible flap.

The tank is preferably circular and comprises a rotating bridge on which are mounted the partial syphons and the extraction devices, the light-sludge inlets of the extraction devices being arranged at the front in the direction of rotation of the bridge, while the scraper blades of the extraction devices are incurved with the concavity orientated in the direction of rotation of the bridge.

In one form of preferred construction, the circular tank comprises a central inlet for untreated water consisting of a vertical column supporting the rotating bridge, a peripheral channel for the evacuation of clear water, a central channel for evacuating dense sludges, an annular bowl surrounding the said column and connected to an evacuation spout for light sludges, the partial syphons carried by the rotating bridge having their rising pipe extending between the said column and the said bowl, while their down pipes plunge into the said bowl.

The objects, characteristic features and advantages of the invention will further be brought out in the description which follows below of one form of construction chosen by way of example, with reference being made to the accompanying drawings, in which:

FIG. 3 is a view to a larger scale of one of the partial syphons fitted on the settling tank for the evacuation of light sludges;

FIG. 4 is a view on a still larger scale of the pneumatic regulating device of the partial syphon;

FIG. 5 is a detail view of a scraper element for dense sludges and for the extraction of light sludges, shown in vertical section taken in the direction of the arrows V—V of FIG. 2, and to a larger scale than this figure;

FIG. 6 is a view of this element looking in the direction of the arrows VI—VI of FIG. 5.

Figure 1:
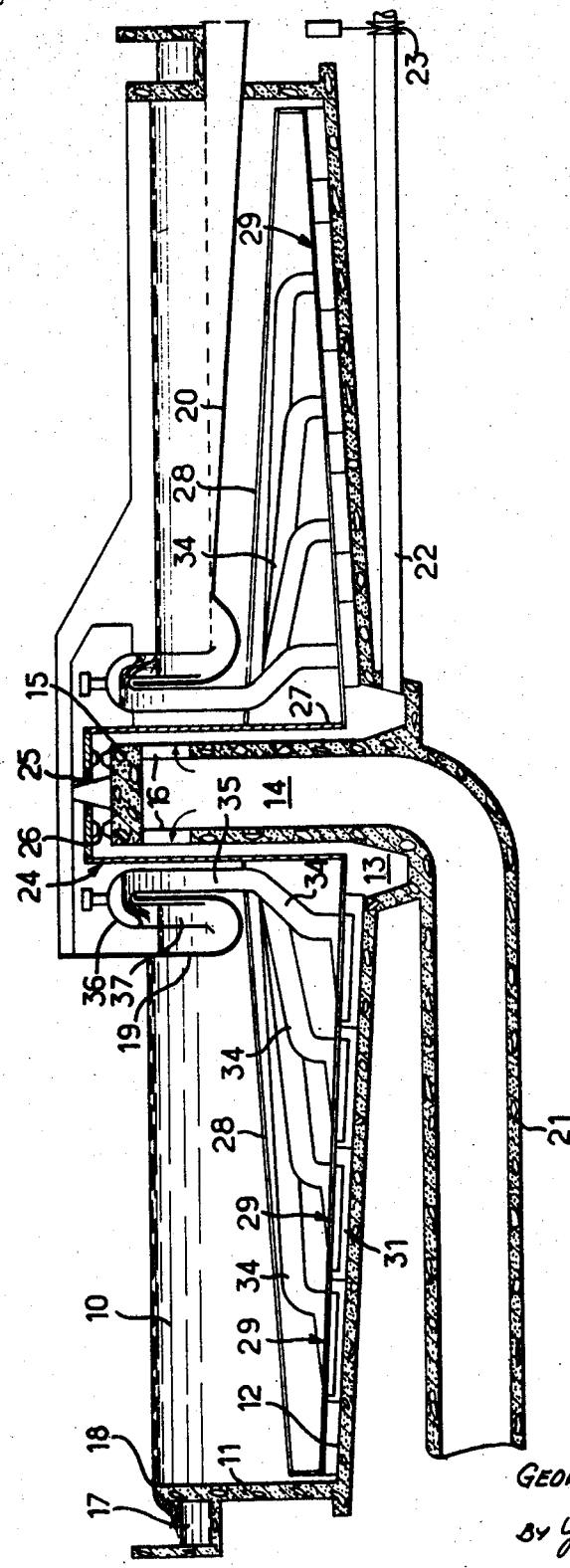
FIG. 1 is a view in vertical section of a sludge settling tank according to the invention.
Figure 2:
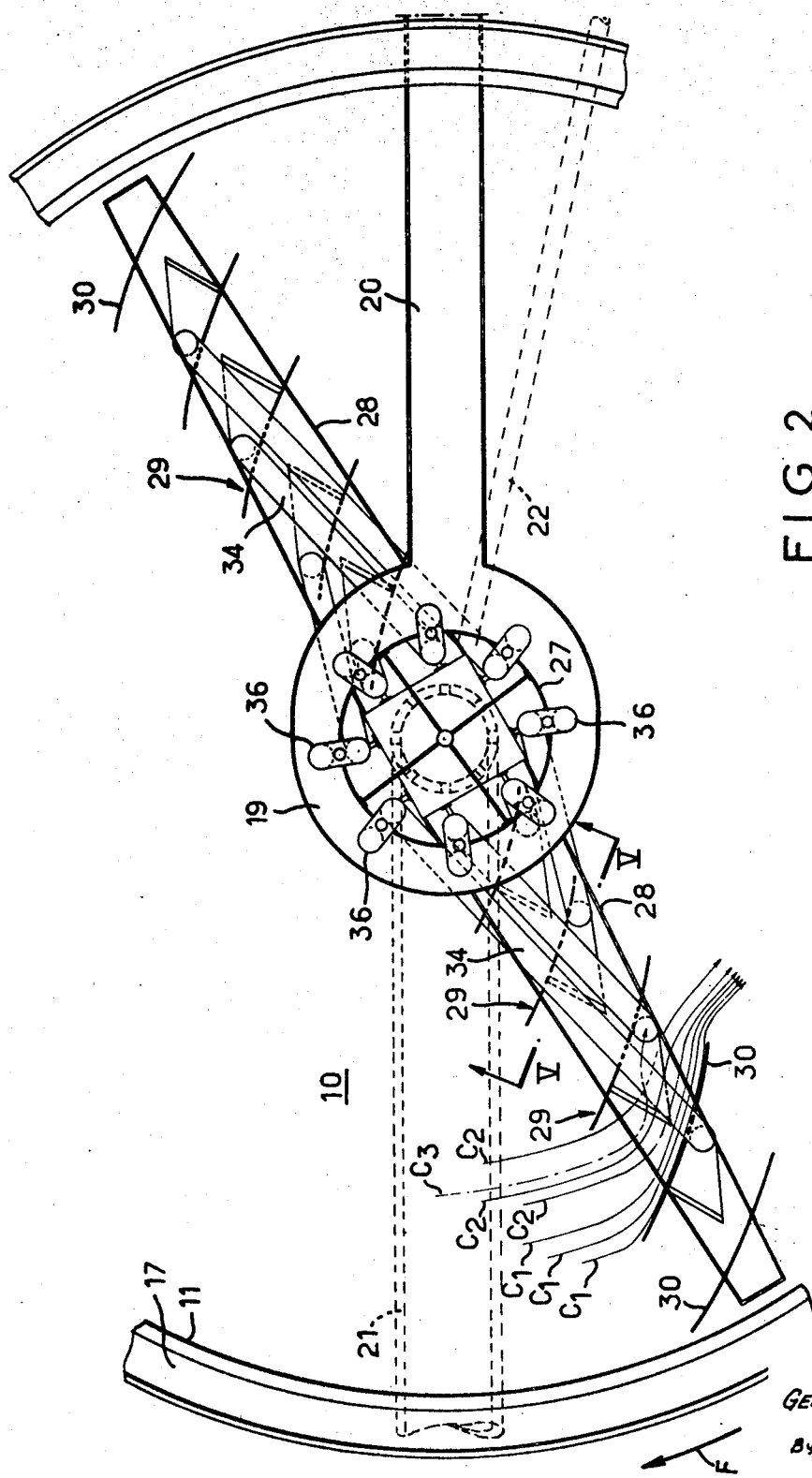
FIG. 2 is a partial view in plan of this tank.

In the form of embodiment shown in FIGS. 1 and 2, a circular settling tank 10 comprises a vertical cylindrical side wall 11 and a bottom 12 which is given a slight slope from the periphery to a central annular channel or pit 13. At the centre of the channel 13 is provided a hollow vertical as pillar 14 having a horizontal upper wall 15 and below this latter, openings 16 for communication with the tank 10.

The lateral wall 11 of the tank 10 is surrounded by a peripheral channel 17 into which the overflow of the tank 10 is allowed to pour at 18.

In addition, an annular bowl 19 is arranged around the pillar 14 while being spaced apart from this latter and from the bottom 11. The bowl 19 is connected to a radial spout 20 extending with a slight slope beyond the periphery of the tank 10.

The tank has an inlet for unpurified water and three evacuation outlets for clear water, light sludges and dense sludges respectively.

The admission of unpurified water is effected by a conduit 21 coupled to the pillar 14. The evacuation of clear water is effectel by the peripheral channel 17. The evacuation of light sludges is effected by the spout 20 and the evacuation of dense sludges is made by a conduit 22 which is connected to the central channel 13 and which comprises a gate-valve 23. The latter is preferably automatically operated so as to act intermittently or as may be required.

The various parts which have just been described are fixed. The settling tank 10 further comprises a moving portion consisting of a rotating bridge 24. The latter is pivoted at 25 on the upper wall 15 of the pillar 14, and is supported by a bearing 26.

The rotating bridge 24 which is driven in slow rotation by any appropriate means (not shown) comprises a central drum 27 which surrounds in spaced relationship the pillar 14 and which is surrounded, also in spaced relationship by the bowl 19. The bridge 24 also comprises two radial arms 28 which are close to the bottom 12 and which are diametrically opposite each other.

Each arm 28 carried a plurality (five in the example shown) of extractor devices 29 (FIGS. 1, 2, 5 and 6) arranged so as to work inside the tank 10 by effecting a selection between the light sludges and the dense sludges for the purpose of evacuating separately these two kinds of sludge. Each extractor service 29 comprises on the one hand an inlet 33 for light sludges slightly spaced above the bottom 12, and on the other hand a scraper means 31 co-operating with the bottom 12 and adapted to direct the dense sludges towards the channel 13.

The scraper means comprises an incurved blade 30 with its concavity facing the direction of rotation (arrow F, FIG. 2) of the rotating bridge 24, and consists of a flexible flap 31 fixed to the blade 30 and arranged in contact with the bottom 12.

The inlet 33 for light sludges is directed upwards and is arranged in front in the direction of rotation (arrow F) of the rotating bridge 24. It is arranged in an extraction box 32 connected to a conduit 34. The box 32 is mounted on the extrados of the scraper 30.

It is to be noted that the extractor devices 29 mounted in the vicinity of the periphery of the tank 10 comprise only the scraper means 31 for dense sludges, that is to say they are not provided with inlets 33 for light sludges.

The position and the shape of the inlet 33, forming a suction opening, are such that the current-flow lines of the settled sludge with respect to this opening are as follows (see FIG. 2):

For the lines such as C1, the settled sludge is simply moved laterally and compressed by the passage of the scraper 30, 31; it remains at the bottom of the settling tank;

For the lines such as C2, the lateral movement of the sludge is less. It passes under the flat mouth of the suction opening which also compresses it;

Finally, the lines such as C3 are sucked-in by the conduit 34.

It should be noted that, for the same flow-rate sucked-in by the conduit 34, the proportion of dense sludge which follows the line C3 depends on the general level of this sludge in the bottom of the settling tank, that is to say on the frequency at which the automatic outlet gate 23 for the sludges is operated.

Each conduit 34 is coupled to the rising pipe 35 of a syphon 36, of which the down pipe is seen at 37 in FIGS. 1 and 3. The pipe 35 extends in spaced relationship between the drum 27 and the bowl 19, while the pipe 37 plunges into the bowl 19.

The various syphons 36, eight in the example shown, are distributed with a circular symmetry, as shown in FIG. 2.

Each syphon 36 is of the partial type, that is to say it operates with an air space 38 (FIG. 3) which is maintained above the liquid in the syphon, comprising a level N in the rising pipe 35, an overflow by the overfall 39 which separates the pipes 35 and 37, and a level N' in the down-pipe 37.

The maintenance of a partial state of the syphon 36, that is to say the retention of a limited volume of air at 38 results from an equilibrium between an outflow of air on the one hand, if it acted alone, would cause the syphon to fill completely with liquid, and on the other hand an inflow of air which, if it acted alone, would cause the unpriming of the syphon. The outflow of air results from the bubbles 41 which are carried away by the liquid along the down-pipe 37 towards the downstream side. This outflow can be increased to the extent required by means of a suction pipe 42. The air-inflow is ensured by an inlet means 40.

The air-inlet 40 is controlled for example by a regulator 43 (FIGS. 3 and 4) which comprises a balanced valve having a head 44 co-operating with a seating 45. The head 44 is coupled by a rod 46 to a diaphragm 47 which divides a chamber into two fluid-tight compartments, an upper balancing chamber 48 connected by a conduit 49 to the space 38 and a lower pilot chamber 50 for example, connected to a pilot conduit 51, the pressure of which is fixed or controlled in dependence on one or more appropriate factors.

It is the pilot gas-pressure 51 which defines the overflow stream at 39 and in consequence, the liquid flow passing through the syphon 36. It can be seen from FIG. 3 that the level of the settling tank 10 is at $N_1$, the upstream piezometric level of the sludge is at $N_2$, the level $N_2$ being slightly below the level $N_1$, the downstream level in the bowl 19 is $N_3$ (including the spout 20), and the minimum downstream level which can be obtained in the bowl 19 is $N_4$.

The pressure between $N_2$ and $N_3$ necessary to permit the syphon 36 to carry out its regulator function is very small, of the order of about 20 centimetres of water only. However, the dimensioning of the syphons 36 is such that it can operate with a much higher pressure, of the order of one metre, between $N_2$ and $N_4$.

During normal working, it is the same pilot pressure which is admitted to the conduits 51 of the various syphons 46.

The bridge 24 rotates slowly in the direction F (see FIG. 2) and the unpurified water is admitted through the conduit 21, the pillar 14 and the openings 16 to the settling tank 10. The clear water is evacuated by overflow at 18 into the peripheral channel 17. The most dense sludges are pushed by degrees towards the central channel 13 by the flaps 31, from which they are evacuated by the conduit 22 by virtue of the intermittent opening of the gate-valve 23.

The lightest sludges are sucked-in through the openings 35, the conduits 34 and the syphons 36 and are evacuated through the bowl 19 and the spout 20.

By virtue of the pilot pressure at 50, which is the same for all the syphons 36, the latter are all permitted to work in the same manner between the levels $N_1$ and $N_3$, which tends to prevent choking.

In an alternative form, different pilot pressures can be applied to the various syphons 36 in order that these latter may have different rates of flow adapted to a drawing-off programme which favours the conditions of utilization.

Any tendency to choking-up is also avoided in this case.

If however one of the syphons 36 becomes blocked, it can immediately be cleared in a very simple manner. All the other syphons are unprimed by admitting excess air to their respective air spaces 38. The downstream level $N_3$ is no longer maintained and falls to the minimum level $N_4$. For this reason, the pressure head of the blocked syphon becomes considerably increased, which produces an increased pressure effect and instantaneously frees the syphon.

The operation of the installation under various conditions of use will now be described below in a more detailed manner.

With one or several identical settling tanks, when it is desired to draw-off identical liquid flow-rates of light sludges from each zone covered by the travel of the scrapers, it is only necessary to apply the same pilot pressure to all the syphon regulators in order to obtain this result. The different losses of pressure existing between the various pipes due to their different lengths are then compensated for by the creation of also different depressions inside the syphons. From this point, any tendency to obstruction of one of the pipes is simply accompanied by a variation of the depression in the corresponding syphon, but the flow-rate is maintained, and the device itself obviates the tendency of the pipes to become choked.

It should be observed that this behaviour is entirely different from that of a single piping system provided with an adjustable weir. In this case in fact, the height of setting of this weir results in precarious equilibrium between the flow-rate desired and the pressure losses in the piping which vary considerably with the nature of the sludges and the flow-rate itself.

If the sludge becomes thicker, the flow-rate diminishes; it may even stop completely if the density of the sludge has increased so much that the pre-set pressure no longer compensates for the difference in weight between the column of sludge contained in the piping and an equal height of clear water.

This self-cleaning action of the device according to the invention is obviously only valid within the limits of the excess pressure allocated to the syphons, but it is only necessary to devote about 10 centimetres in order to obtain a positive effect. In fact, by this means the fault is attacked as soon as it appears and thus immediately tends to become less, whereas in the case of a simple overflow weir, it ends on the contrary to become aggravated, the reduction of flow causing an accentuation of the thickening in the tube, etc.

However, in the event of a blockage being produced after all in a pipe, the remedy is available which consists of cutting-off the pilot pressure to all the syphons except that which corresponds to the defective pipe.

The immediate drop in flow-rate then creates a fall in the downstream level common to all the syphons, so that the only syphon remaining in service has available all the pressure provided, which ensures immediate clearance.

The operation to be effected is thus limited to the closure and opening of a few cocks without any modification of the settings of the installation and without any manual contact with the sludge.

If, in an installation comprising several settling tanks, it is proposed to draw-off different outputs for each tank, it is only necessary to put all the regulators of a single settling tank at identically the same pilot pressure.

If, in a settling tank, it is desired to determine identical flow-rates by weight of materials in suspension drawn-off by a number of syphons, the pilot pressure controlling the various regulators is adjusted to different values for each of them and modulated as a function of the results to be obtained. In the first place, the experimental curves of the material deposited and of the concentrations in the settling tank per unit of surface area are established as a function of the distance from the surface considered to the centre of the settling tank and for different through-flows. On this family of curves sections are cut-out corresponding to different scrapers and the corresponding liquid flow-rates to be obtained from each of the syphons for each through-flow are calculated.

This solution, which corresponds to the minimum expenditure of energy for the "return" pumping, can be applied by the use of a few simple additional devices of the hydrostatic type, which suitably modulate the pilot pressures.

It will be noted that in this case also, the adjustments affected remain stable even if certain clearances are effected from time to time, as explained above.

It will be appreciated that, according to the invention, the syphons 36 make it possible to resolve the difficult problem of the joint between the sludge collecting pipes and the outlet spout for these sldges, since the syphon is astride the end of this spout and discharges the sludges directly into the fixed portion of the device.

The invention is of course not limited to the form of construction described above and illustrated, but includes all its alternative forms.

What I claim is:

1. A sludge-settling apparatus comprising a tank having an intake for sludge water, an overflow for clear water and at least one sludge-evacuation system, said sludge-evacuation system comprising a plurality of partial siphons, a conduit feeding sludge to each said partial siphon, each conduit having an inlet for sludge, means mounting said inlets for rotary movement in the vicinity of the bottom of said tank to sweep concentric circular paths, and means for moving said inlets in said circular paths, each said partial siphon having means for maintaining a body of gas above the liquid in said siphon, means for selectively controlling the pressure of said body of gas, said last-named means comprising means for continuously supplying gas to said body of gas and means responsive to the pressure of said body of gas to vary the flow rate of said supplied gas thereby to maintain constant said pressure, central receptacle means to which said siphons deliver sludge, and means for conveying sludge from said receptacle means to the outside of said tank.

2. A sludge-settling apparatus as claimed in claim 1, said intake opening centrally into said tank, said mounting means comprising means supported on said intake for rotation about a central vertical axis of said tank.

3. A sludge-settling apparatus as claimed in claim 1, said siphons being mounted for rotation with said conduits relative to said receptacle means.

4. A sludge-settling apparatus as claimed in claim 1, said conveying means being stationary with said tank, said conduits being rotatable beneath said conveying means.

References Cited

UNITED STATES PATENTS

| 3,166,502 | 1/1965 | Kelly | 210—528 |
| 3,298,529 | 1/1967 | Longnecker | 210—528 X |
| 3,337,057 | 8/1967 | Bolton | 210—530 X |

FOREIGN PATENTS 703,182　1/1954　Great Britain.

JAMES L. DECESARE, Primary Examiner

U.S. Cl. X.R.

137—142; 210—120, 528